United States Patent Office 3,032,066
Patented May 1, 1962

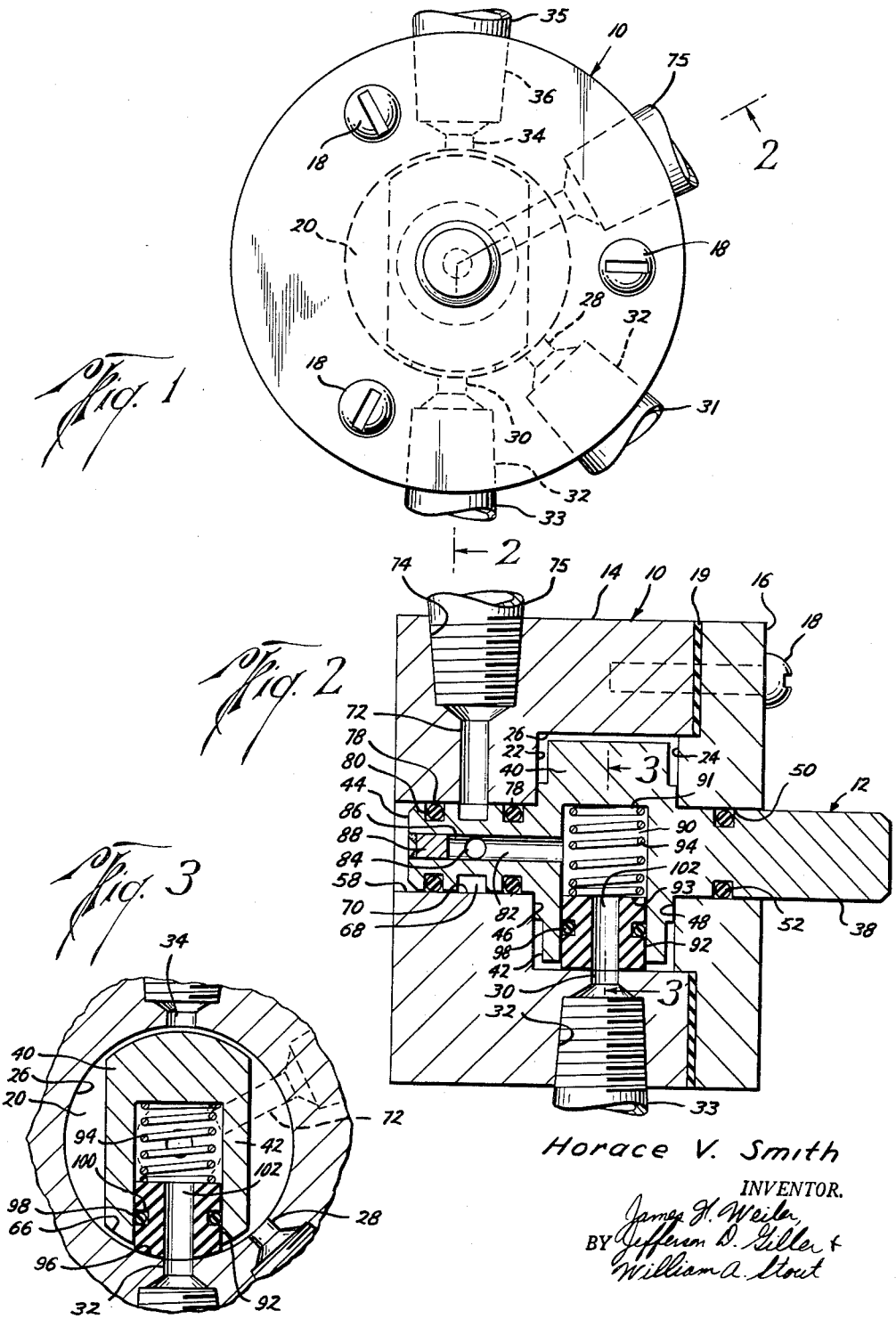

3,032,066
ROTARY VALVE
Horace Vernon Smith, Houston, Tex., assignor to Oil Metering and Processing Equipment Corp., Houston, Tex., a corporation of Texas
Filed June 29, 1959, Ser. No. 823,446
12 Claims. (Cl. 137—625.43)

This invention relates to an improved rotary valve and more particularly to such a valve used as a pilot valve to direct fluid pressure alternately to a port while simultaneously allowing back pressure from another port to be exhausted through the pilot valve.

A pilot valve is commonly used to control the flow of fluid pressure to another valve or valves to actuate such other valves. Normally in such operation the pilot valve alternately directs fluid pressure to at least one conduit while allowing back pressure from another conduit to exhaust through the pilot valve. These conduits are connected to the valves or other devices which are operated by this alternating flow of fluid pressure from and to the pilot valve.

It is the general object of the present invention to provide an improved pilot valve of the rotary type.

It is common in rotary pilot valves to have a rotor rotatably mounted in a casing with the rotor being rotated or oscillatably rotated by external torque to selectively direct fluid pressure through a port in the casing while allowing back pressure from another port to exhaust through the casing. However, such rotary pilot valves now in use are so constructed that there is an axial thrust on the rotor created by the pressure of fluid passing through and/or around the rotor thereby requiring a portion of the torque used to rotate the rotor to be used in overcoming the friction caused on bearing surfaces by this axial thrust. In certain delicate operations little torque is available to rotate the rotor and the added resistance to turning the rotor caused by this axial thrust is objectionable.

Not only does the axial thrust of fluid force in the present rotary pilot valves increase the torque necessary to turn the rotors, but the fluid force and hence the axial thrust varies during turning of the rotor from one port to another. This is also objectionable where little torque is available to rotate the rotor and often causes hesitation in the rotation of the rotor as the torque may be sufficient to commence the rotation of the rotor but insufficient to complete sufficient rotation of the rotor to the next port in the casing.

It is therefore another object of the present invention to provide an improved rotary valve in which the fluid forces in and/or around the rotor are balanced at all times so there is no axial thrust on the rotor created by such fluid forces.

It is another object of the present invention to provide such a valve in which all fluid pressure entering and leaving the rotor does so other than axially to the axis of rotation of the rotor.

Another object of the present invention is to provide such a rotary valve in which all opposed radial surfaces of the rotor exposed to fluid pressure externally of the rotor and within the casing are equal in area so that axial force on the exterior of the rotor from fluid pressure within the casing is balanced and there is no resultant axial force on the rotor.

Additionally, in the rotary valves now in use a fluid passageway through the rotor communicates with the exterior of a portion of the rotor which portion of the rotor is in sliding contact with an internal cylindrical wall of the valve chamber within the casing. This portion of the rotor is intended to fit against the internal wall of the casing with a fluid tight seal so that fluid pressure cannot escape into the valve chamber, but continued rotation of the rotor wears away this portion of the rotor and permits fluid to escape into the valve chamber.

It is therefore a still further object of the present invention to provide an improved rotary valve in which wear on the portion of the rotor in contact with the cylindrical inner wall of the valve chamber does not affect the fluid tight seal between the rotor and the inner cylindrical wall of the valve chamber.

A more particular object of the present invention is an improved rotary valve in which that portion of the rotor in sliding contact with the cylindrical inner wall of the chamber includes a slidably mounted annular thrust plug which thrust plug makes a fluid tight seal between the rotor and inner cylindrical wall of the valve chamber at all times.

A still further object of the present invention is to provide such a rotary valve which is economical to construct and maintain and which is dependable in operation. Other and further objects, features and advantages will be apparent from the following description of the presently preferred example of the invention, given for the purpose of disclosure and taken in conjunction with the accompanying drawings where like character references designate like parts throughout the several views and where FIGURE 1 is an end view of a rotary pilot valve constructed in accordance with the present invention, FIGURE 2 is a sectional elevation taken along the line 2—2 of FIGURE 1, and FIGURE 3 is a sectional view taken along the line 3—3 of FIGURE 2.

Referring now to the drawings, the rotary valve as a whole includes a casing 10, generally cylindrical in form, and a rotatably mounted rotor 12. The casing 10 includes a block 14 of generally U-shaped configuration, when viewed in sectional elevation as illustrated in FIGURE 2, and an end plate 16 secured such as by screws 18 over the right end of the block 14 as viewed in FIGURE 2 forming a valve chamber 20 within the casing 10. Preferably a gasket 19 is placed between the block 14 and the end plate 16. The valve chamber 20 is cylindrical in shape and is defined by the opposed inner walls 22 and 24 in the block 14 and at the inner surface of the cover plate 16 respectively and by a lateral interior cylindrical wall 26 in the block 14 between the opposed inner walls 22 and 24.

Provided in the casing 10 through the block 14 and communicating with the valve chamber are two circumferentially aligned and circumferentially spaced control passageways or ports 28 and 30 radially directed toward the axis of the valve chamber 20. Each of said ports 28 and 30 is provided with means to connect it to an external fluid conduit 31 and 33 respectively, with such means preferably being an internally threaded counter bored portion 32. Through these control ports 28 and 30 fluid pressure is alternately directed by the rotor 12 as later explained.

An exhaust passageway or port 34 is provided through the casing 10 to the valve chamber 20 at any convenient place where it will not be covered by the rotor 12 during movement of the rotor 12 as later described. Preferably such exhaust port 34 is provided through the block 14 and spaced approximately 135° from the control port 28 as illustrated in FIGURE 1. If desired, this exhaust port may also be provided with means for connection to a fluid conduit 35, with such means preferably being the internally threaded counter bored portion 36.

The rotor 12 is rotatably mounted in the valve chamber 20 with its axis of rotation coinciding with the axis of the cylindrical valve chamber 20. The rotor 12 includes a cylindrical end portion 38 extending through the casing 10 at the end plate 16 and rotatably journaled therein, an enlarged diameter body portion 40 within the valve chamber 20 having a radially extending arm 42 made integral with the body portion 40, and a second end portion 44 of lesser external diameter than the body portion 40 extending through the casing 10 at the cylindrical passageway 58 in the block 14 and rotatably journaled therein.

Adjacent the opposed inner walls 22 and 24 of the valve chamber 20 the body portion 40 has the external shoulders 46 and 48 respectively, to prevent axial movement of the rotor 12. An O-ring 52 in an annular groove 50 in the end portion 38 of the rotor 12 at the end plate 16 prevents the escape of fluid from the valve chamber 20 along the end portion 38 of the rotor 12 when desired such as in use with gases of objectionable odors or with inflammatory gases near a flame.

The radially projecting arm 42 is cylindrical in shape and has an outer end 66 (see FIGURE 3) concentric with and adjacent the cylindrical lateral inner wall 26 of the valve chamber 20 with said end 66 being of larger diameter than the diameter of the control ports 28 and 30. Formed in the surface of the end portion 44 of the rotor 12 at a point axially spaced along the rotor 12 from the axis of the radial arm 42 and within the cylindrical passageway 58 is an annular groove 68 which with the cylindrical wall 70 of the passageway 58 in the block 14 forms an annular feed passageway surrounding the rotor 12. Communicating between the exterior of the casing 10 and this annular groove 68 is a supply passageway or port 72 whereby a supply of fluid pressure from exterior of the casing 10 may be supplied to the annular feed passageway defined by the annular groove 68 and the wall 70. Means to connect a fluid supply conduit 75 to the supply port 72 may be provided such as by the enlarged internally threaded counter bored portion 74. Escape of fluid pressure from the annular groove 68 along the rotor 12 is prevented by an O-ring 78 in each of two annular grooves 80 in the rotor 12 on each side of the annular groove 68. These O-rings also prevent the escape of fluid from the valve chamber 20 through the block 14.

Communicating between the annular groove 68 ond the end 66 of the radial arm 42 is a flow passageway 82 in the rotor 12 which for ease of construction includes a radial port 84 drilled through the annular groove 68 and a straight axial portion 86 formed by drilling from the exterior of the end portion 44 of the rotor 12. This straight portion 86 of the flow passageway 82 is closed from the free end of the end portion 44 of the rotor 12 such as by the plug 88 so that no fluid pressure enters or leaves axially of the rotor 12.

The radial arm 42 has an internal bore 90 forming a part of the flow passageway 82 and extending to the end 66 of the radial arm 42 with said internal bore 90 being of greater diameter than either of the control ports 28 or 30 in the casing 10. Slidably mounted in the internal bore 90 is an annular thrust plug 92 constantly urged outwardly by a compression spring 94 bearing against the inner end 91 of the internal bore 90 and the inner end or side 93 of the annular thrust plug 92. The inner side 93 of the thrust plug 92 is exposed to fluid pressure in the internal bore 90. The thrust plug 92 has its outer end 96 (see FIGURE 3) concentric to the cylindrical internal lateral wall 26 of the valve chamber 20 thereby providing a close fit between the end 96 of the thrust plug 92 and the cylindrical wall 26. The thrust plug 92 is made of wear resistant material such as Teflon. Escape of fluid pressure between the exterior of the thrust plug 92 and the internal bore 90 of the radial arm 42 is prevented by an O-ring 98 in an annular groove 100 cut in the external surface of the thrust plug 92. An axial passageway 102 in the thrust plug 92 allows fluid pressure to pass through the thrust plug 92.

In operation, fluid pressure from the fluid supply conduit 75 is supplied to the supply port 72 from the exterior of the casing 10 and conduits 31 and 33 are connected to the ports 28 and 30. The rotor 12 is rotated by a torque, from any desired source, not shown, applied to the end portion 38 of the rotor 12 to align the radial arm 42 and the thrust plug 92 with one of the control ports 28 or 30 such as the port 30 shown in FIGURE 2. Fluid pressure entering the supply port 72 passes to the annular feed passageway formed by the annular groove 68 in the rotor 12 and the internal wall 70 of the passageway 58 in the casing 10, passes into the flow passageway 82 in the rotor 12 from the annular feed passageway by means of the port 84, passes through the passageway 102 in the thrust plug 92, and passes into the port 30 and into the conduit 33. Back pressure in the conduit 31 connected to the port 28 passes into the valve chamber 20 and out the exhaust port 34. The port 28 is circumferentially spaced a sufficient distance from the port 30 so that the radial arm 42 does not cover the port 28 when the port 30 is covered by the thrust plug 92. When desired, the rotor 12 is then rotated in a reverse direction by the application of torque to the end portion 38 of the rotor 12 to turn the radial arm 42 until it is in alignment with the port 28 which uncovers the port 30 and allows back pressure in the conduit 33 connected to the port 30 to pass into the valve chamber 20 and out the exhaust port 34. Fluid pressure entering the supply port 72 and passing through the rotor 12 is then directed into the port 28. This sequence is repeated as desired.

During such sequence of operation the spring 94 always maintains the thrust plug 92 in sealing contact with the cylindrical wall 26 regardless of wear on the end 96 of the thrust plug 92.

This is especially important in low pressure operations where there may be insufficient fluid pressure within the rotor 12 bearing against the inner end of the thrust plug 92 to maintain it in sealing contact with the cylindrical wall 26. However, in higher pressure operations the spring 94 may be eliminated as the pressure acting against the inner end of the thrust plug 92 will maintain it in sealing contact with the cylindrical wall 26.

No fluid pressure creates an axial thrust on the rotor 12 because fluid pressure enters the rotor 12 radially of the axis of the rotor 12 and leaves the rotor radially thereof. Also, all opposed radial surfaces exposed to fluid pressure within the valve chamber 20 are equal in area because neither end of the rotor is exposed to fluid pressure within the valve chamber 20. Thus there is no resultant force in any axial direction of the rotor 12 because of fluid pressure in the chamber 20 and therefore no axial thrust on the rotor 12.

The present invention, therefore, is well suited to carry out the objects and attain the advantages and ends mentioned as well as others inherent therein. Certain changes in details and rearrangements of parts will suggest themselves to those skilled in the art and, accordingly, the invention is to be limited only by the spirit thereof and the scope of the appended claims.

What is claimed is:

1. In a pilot valve including a casing containing a cylindrical valve chamber having a cylindrical lateral wall, at least two circumferentially spaced and aligned ports through the cylindrical wall of the casing, an exhaust port through said casing to the valve chamber spaced from said circumferentially spaced first and second ports, a rotor rotatably mounted in said valve chamber with its axis of rotation coinciding with the axis of the valve chamber, said rotor including an arm within the valve chamber projecting radially from said rotor and having an end in circumferential alignment with said circumferentially spaced first and second ports and adjacent to the cylindrical lateral wall said end being of lesser cross-sectional dimension than the distance between the two circumferentially spaced ports, whereby when said end is over one of the last mentioned ports the other port is uncovered; the improvement comprising an annular feed passageway surrounding the rotor spaced from the arm and ends of the rotor, a fluid supply conduit opening to said feed passageway, and a flow passageway through the rotor communicating between the annular passageway and said end of the arm and forming a port in said end of the arm.

2. The improvement of claim 1 including an annular thrust plug of wear resistant material slidably mounted in the flow passageway at the end of the arm, said thrust plug having a side thereof exposed to fluid pressure within the flow passageway and an opposite side thereof in contact with the cylindrical lateral wall.

3. The combination of claim 2 including spring means within the rotor urging the thrust plug against the cylindrical lateral wall.

4. In a pilot valve including a casing containing a cylindrical valve chamber having a cylindrical lateral wall, at least two circumferentially spaced and aligned ports through the cylindrical wall of the casing, an exhaust port through said casing to the valve chamber spaced from said first and second ports, a rotor rotatably mounted in said valve chamber with its axis of rotation coinciding with the axis of the valve chamber, said rotor including an arm within the valve chamber projecting radially from said rotor and having an end in circumferential alignment with said first and second ports and adjacent to the cylindrical lateral wall said end being of lesser cross-sectional dimension than the distance between the two circumferentially spaced ports, whereby when said end is over one of the last mentioned ports the other port is uncovered; the improvement comprising, said rotor having all opposed radial surfaces exposed to fluid pressure in said valve chamber equal in area, an annular feed passageway surrounding the rotor spaced from the lateral arm, a fluid supply conduit opening to said feed passageway, a flow passageway through the rotor communicating between the feed passageway and said end of the lateral arm and forming a port in said end of the lateral arm.

5. A valve comprising, a casing having opposed interior walls and an interior cylindrical lateral wall formed by forming a closed cylindrical valve chamber, first and second circumferentially spaced and aligned passageways extending through the cylindrical lateral wall, an exhaust passageway through said casing to the valve chamber spaced from said first and second passageways, a rotor rotatably mounted in said valve chamber with its axis of rotation coinciding with the axis of the valve chamber, said rotor having all opposed radial surfaces exposed to fluid pressure in said valve chamber equal in area, said rotor including at least one cylindrical end portion extending through one of said opposed interior walls, a body portion within the valve chamber, and an arm projecting radially from the body portion, said arm having an end in circumferential alignment with said first and second passageways and adjacent to the cylindrical lateral wall said end being of lesser cross-sectional dimension than the distance between the two circumferentially spaced ports, whereby when said end is over one of the last mentioned ports the other port is uncovered, a flow passageway in the rotor communicating with said end of the arm and forming a port in said end of the arm, and fluid supply means communicating with said flow passageway radially of the rotor in all positions of said rotor.

6. The combination of claim 5 including an annular thrust plug of wear resistant material slidably mounted in the flow passageway at the end of the arm, said thrust plug having a side thereof exposed to fluid pressure within the flow passageway and an opposite side thereof in contact with the cylindrical lateral wall.

7. The combination of claim 6 including spring means within the rotor urging the thrust plug against the cylindrical lateral wall.

8. A valve comprising, a casing having opposed interior walls and an interior cylindrical lateral wall forming a closed cylindrical valve chamber, said valve chamber including first and second circumferentially spaced and aligned ports extending through the cylindrical lateral wall and an exhaust port through said casing spaced from said first and second ports; a rotor rotatably mounted in said valve chamber with its axis of rotation coinciding with the axis of the valve chamber, said rotor having all opposed radial surfaces exposed to fluid pressure in said valve chamber equal in area, said rotor including at least one cylindrical end portion extending through one of said opposed interior walls, a body portion within the valve chamber, and an arm projecting radially from the body portion, said arm having an end in circumferential alignment with said first and second ports and adjacent to the cylindrical lateral wall said end being of lesser cross-sectional dimension than the distance between the two circumferentially spaced ports, whereby when said end is over one of the last mentioned ports the other port is uncovered; an annular feed passageway surrounding the rotor; a fluid supply conduit through the casing opening to said annular passageway; and a flow passageway through the rotor communicating between the annular passageway and said end of the arm forming a port in said end of the arm.

9. A pilot valve comprising, a casing having opposed interior walls and an interior cylindrical lateral wall forming a closed cylindrical valve chamber, first and second circumferentially spaced and aligned ports through the cylindrical lateral wall, an exhaust port through said casing to the valve chamber spaced from said first and second ports, a rotor rotatably mounted in said valve chamber with its axis of rotation coinciding with the axis of the valve chamber, said rotor including at least one cylindrical end portion extending through one of said opposed interior walls, a body portion within the valve chamber and an arm projecting radially from the body portion and having an end in circumferential alignment with said first and second ports and adjacent to the cylindrical lateral wall said end being of lesser cross-sectional dimension than the distance between the two circumferentially spaced ports, whereby when said end is over one of the last mentioned ports the other port is uncovered, an annular feed passageway surrounding the rotor spaced from the arm and ends of the rotor, a fluid supply conduit opening to said feed passageway, a flow passageway through the rotor communicating between the feed passageway and said end of the arm, and an annular thrust plug of wear resistant material slidably mounted in the flow passageway at the end of the arm, said thrust plug having a side thereof exposed to fluid pressure within the flow passageway and an opposite side thereof in contact with the cylindrical lateral wall.

10. The invention of claim 9 including spring means within the rotor urging the thrust plug against the cylindrical lateral wall.

11. The invention of claim 9 including said rotor having all opposed radial surfaces exposed to fluid pressure in said valve chamber equal in area.

12. A valve comprising a casing having opposed interior walls and an interior cylindrical lateral wall forming a closed cylindrical valve chamber; first and second circumferentially spaced and aligned ports extending through the cylindrical lateral wall; an exhaust port through said casing to the valve chamber spaced from said first and second ports; a rotor rotatably mounted in said valve chamber with its axis of rotation coinciding with the axis of the valve chamber, said rotor including a body portion within the valve chamber, an arm projecting radially from the body portion, said arm having an end in circumferential alignment with said first and second ports and adjacent to the cylindrical lateral wall said end being of lesser cross-sectional dimension than the distance between the two circumferentially spaced ports, whereby when said end is over one of the last mentioned ports the other port is uncovered, and cylindrical end portions on each side of the body portion, said end portions being rotatably journaled in said opposed interior walls; at least one of said end portions of the rotor extending through one of said opposed interior walls; an annular feed passageway surrounding one of said end portions of the rotor; a fluid supply passageway opening into said annular feed passageway, and a flow passageway through the rotor communicating between the annual feed passageway and said end of the arm.

References Cited in the file of this patent

UNITED STATES PATENTS

| | | |
|---|---|---|
| 825,370 | Zurbuch | July 10, 1906 |
| 1,027,178 | Caskey | May 21, 1906 |
| 1,120,019 | Brehmer | Dec. 8, 1914 |
| 1,217,700 | Brown et al. | Feb. 27, 1917 |
| 2,165,096 | Frechette | July 4, 1939 |
| 2,291,563 | Rotter et al. | July 28, 1942 |
| 2,812,753 | Zubaty | Nov. 12, 1957 |
| 2,821,998 | Mayhew | Feb. 4, 1958 |
| 2,840,109 | Wadleigh | June 24, 1958 |